United States Patent
Todd et al.

[19]

[11] Patent Number: 6,035,183
[45] Date of Patent: Mar. 7, 2000

[54] BASESTATION RSSI AND BER FEEDBACK SIGNAL QUALITY DISPLAY AND TRANSMIT DIVERSITY

[75] Inventors: Stephen Ross Todd, Ottawa; Greg Osborne, Nepean, both of Canada

[73] Assignee: Nortel Networks Corporation, Montreal, Canada

[21] Appl. No.: 08/987,209

[22] Filed: Dec. 9, 1997

[51] Int. Cl.[7] .............................. H04B 17/00; H04B 1/06; H03C 1/62
[52] U.S. Cl. ................................ 455/226.2; 455/226.4; 455/67.7; 455/277.1; 455/101; 455/115
[58] Field of Search ........................... 455/226.2, 226.4, 455/67.7, 67.3, 70, 277.1, 277.2, 101, 115

[56] References Cited

U.S. PATENT DOCUMENTS

| | | | |
|---|---|---|---|
| 5,289,526 | 2/1994 | Chymyck et al. | 455/67.1 |
| 5,471,671 | 11/1995 | Wang et al. | 455/226.2 |
| 5,561,673 | 10/1996 | Takai et al. | 455/277.2 |
| 5,689,439 | 11/1997 | Weerackody et al. | 455/101 |
| 5,697,056 | 12/1997 | Tayloe | 455/67.3 |
| 5,802,039 | 9/1998 | Obayashi et al. | 455/67.1 |
| 5,870,666 | 2/1999 | Tanaka et al. | 455/67.7 |

*Primary Examiner*—Reinhard J. Eisenzopf
*Assistant Examiner*—Eliseo Ramos-Feliciano

[57] ABSTRACT

A system and method for a fixed wireless access terminal to determine and display to a user forward link and reverse link RSSI and BER signal quality information. The reverse link information is measured by a basestation and transmitted to the terminal in a message. The quality information is displayed to the user with sufficient resolution to allow the user to adjust the location of the fixed wireless access terminal to optimize the quality of the link. The reverse link information may also be used as a basis for performing transmit switch diversity.

23 Claims, 6 Drawing Sheets

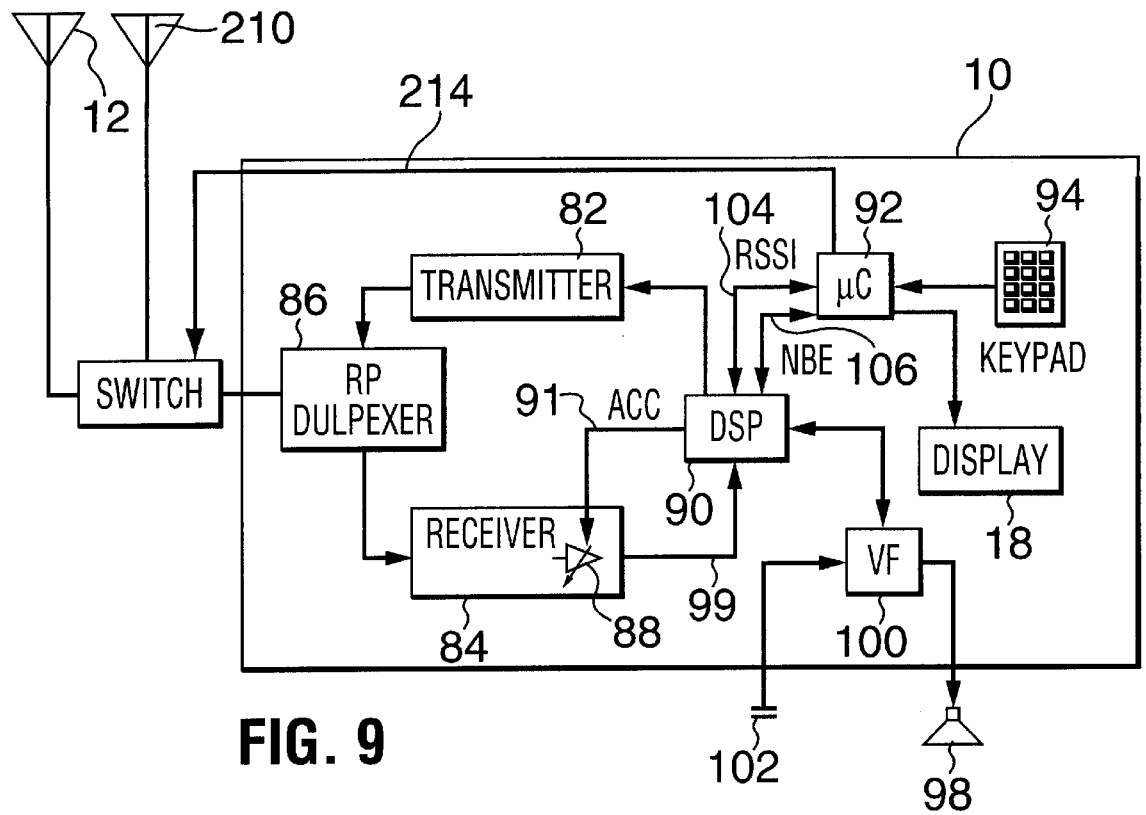
FIG. 9
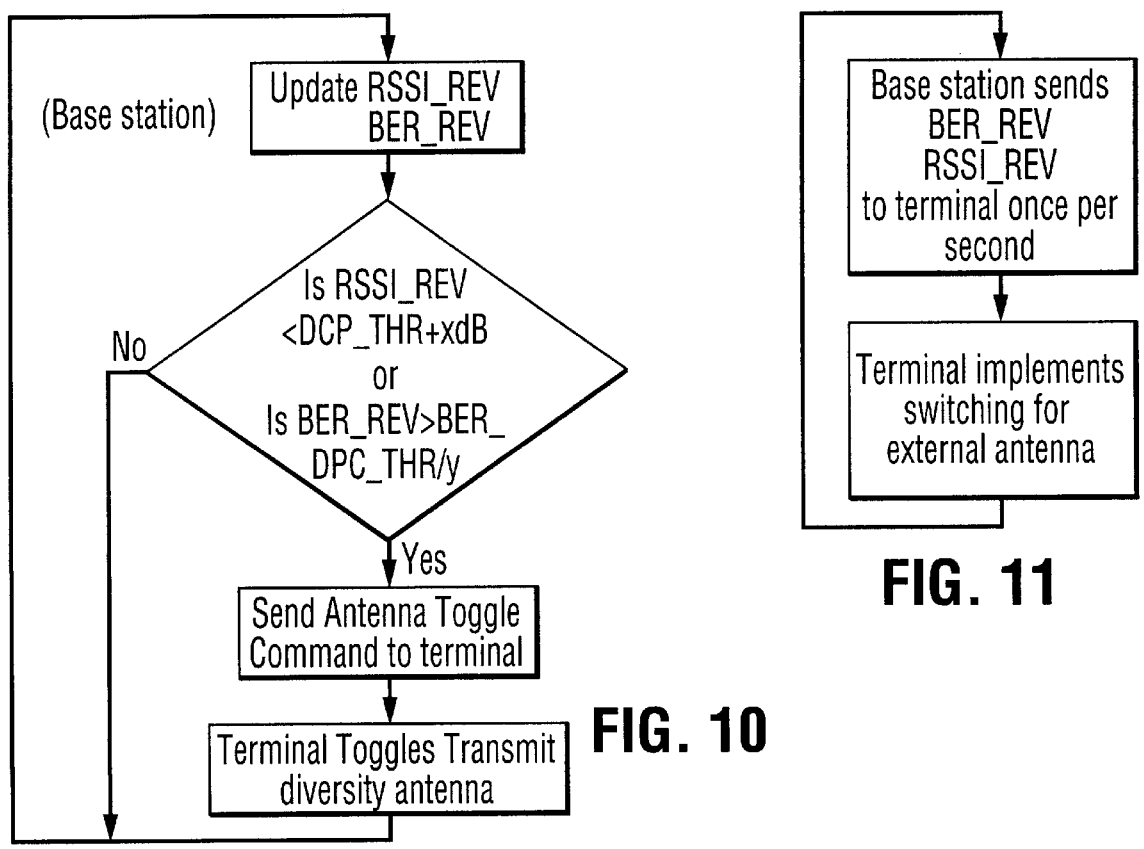
FIG. 10
FIG. 11

BASESTATION RSSI AND BER FEEDBACK SIGNAL QUALITY DISPLAY AND TRANSMIT DIVERSITY

FIELD OF THE INVENTION

The invention relates to systems and methods for providing signal quality information to fixed wireless access terminals.

BACKGROUND OF THE INVENTION

A fixed wireless access terminal is typically installed in a permanent or semi-permanent position within a subscriber's premises. A network of basestations connectable to such fixed wireless access terminals through wireless connections provide normal telephony services and offer an alternative to the conventional twisted pair telephone connections.

In state of the art fixed wireless access terminals, the concept of displaying a signal strength measurement such as the RSSI (radio signal strength indicator) is well known. The intent is to assist a subscriber in locating the fixed access terminal so as to optimize the communications with a basestation. The manner in which this is typically done is to display a bar graph using six characters of a display forming part of the fixed wireless access terminal. There are numerous problems with this approach. To begin, the resolution of the display is typically 10 dB per character. This is insufficient to allow the subscriber to optimally locate the terminal. In addition, there may be a large amount of CCI (co-channel interference) on the forward link (from a basestation to the terminal). This problem is serious in high capacity cellular networks where the desire to reuse frequencies many times can degrade the SIR (signal to interferer ratio) such that the BER (bit error rate) of the forward traffic link is seriously degraded. In such situations, the RSSI will indicate a strong signal strength, but the quality of the signal will not be sufficient. The RSSI alone will not indicate the problem with the BER because it includes both components of the proper signal and the interfering signals.

Another problem with state of the art systems is that the displayed RSSI levels only reflect the quality of the forward link. The result of this is that the user may position the set such that his/her reception characteristics are good, but such that the reception at the other end of the connection is poor.

SUMMARY OF THE INVENTION

It is an object of the invention to obviate or mitigate one or more of the above identified disadvantages.

According to a first broad aspect, the invention provides a method for a fixed wireless access terminal to indicate the quality of a mobile communications link between the fixed wireless access terminal and a basestation, the mobile communications link including a forward link from the basestation to the terminal, and a reverse link from the terminal to the basestation, the method comprising the steps of: a)the terminal measuring an RSSI in the forward link and a BER in the forward link; b)the terminal determining a link quality metric on the basis of both the forward link BER and RSSI; and c)the terminal displaying the link quality metric.

According to a second broad aspect, the invention provides a fixed wireless access terminal for wireless connection to a basestation over a mobile communications link including a forward link from the basestation to the terminal, and a reverse link from the terminal to the basestation, the terminal comprising: a display; and circuitry for measuring a forward link BER and RSSI, determining a link quality metric on the basis of the forward link BER and RSSI, and displaying the link quality metric on the display.

According to a third broad aspect, the invention provides a fixed wireless access terminal for wireless connection to a basestation over a mobile communications link including a forward link from the basestation to the terminal, and a reverse link from the terminal to the basestation, the terminal comprising: a first transmit antenna and a second transmit antenna; a switch for alternatively connecting the first antenna and said second antenna to said wireless connection; circuitry for receiving a message from the basestation respecting the quality of the reverse link, and for, on the basis of contents of the message, instructing said switch to switch from one transmit antenna to another transmit antenna, or not.

BRIEF DESCRIPTION OF THE DRAWINGS

Preferred embodiments of the invention will now be described with reference to the attached drawings in which:

FIG. 9 is a block diagram of a terminal for implementing transmit diversity according to an embodiment of the invention;

FIG. 10 is a flowchart for a first implementation of transmit diversity at the terminal of FIG. 9; and FIG. 11 is a flowchart for a second implementation of transmit diversity at the terminal of FIG. 9.

DETAILED DESCRIPTION OF THE PREFERRED EMBODIMENTS

Figure 1:
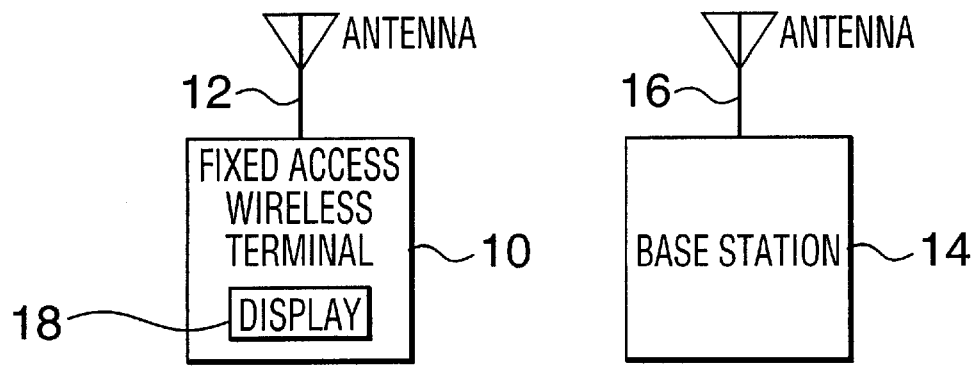
FIG. 1 is a schematic of a fixed wireless access system.

Referring firstly to FIG. 1, a fixed wireless access system includes a fixed wireless access terminal 10 having one or more antennae 12 and a basestation 14 also having one or more antennae 16 for communicating with the fixed wireless access terminal 10. The terminal has a display 18.

The basestation has a messaging capability through which it can send messages to the terminal. This messaging capability, for example, may be done through FACCH (fast access control channel) messages or SACCH (slow access control channel) messages consistent with the IS-54 or IS-136 specifications respectively. Details of messaging via either of these two channels are well understood in the art and will not be provided here. It is to be understood that other messaging schemes may alternatively be used within the scope of the invention.

Figure 2:
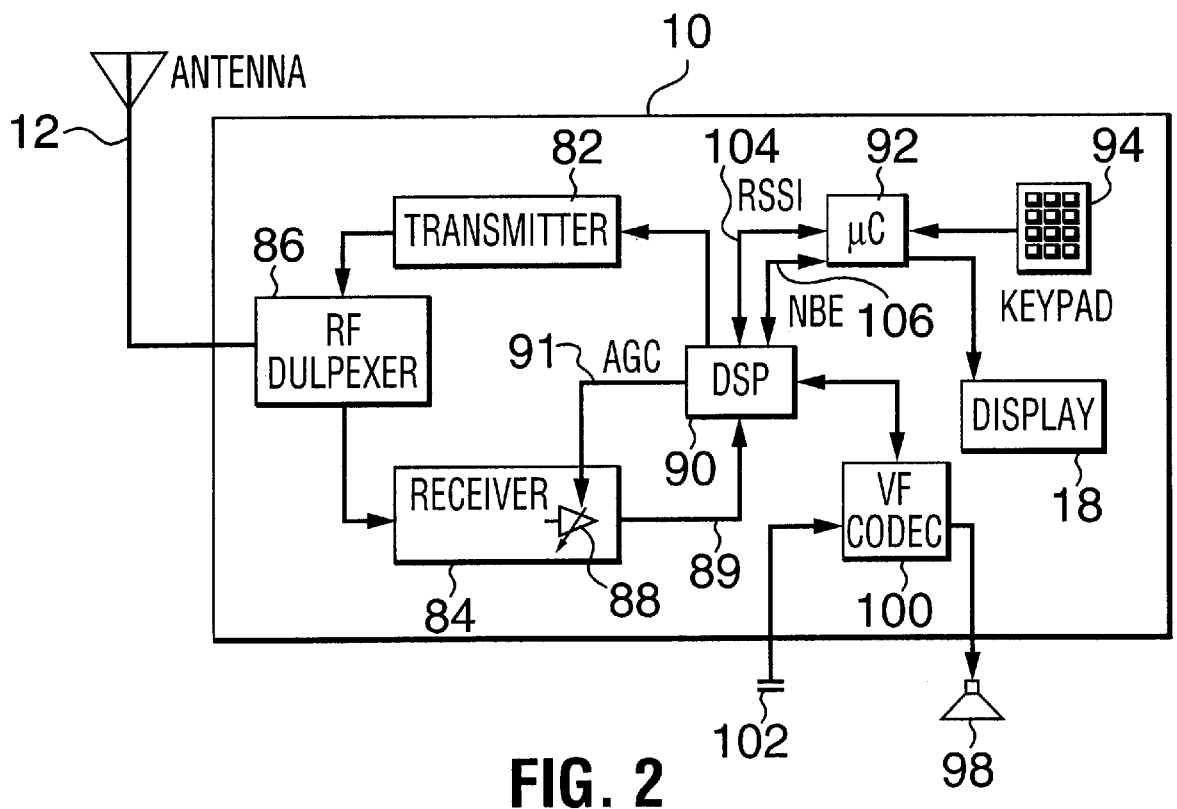
FIG. 2 is a block diagram of a fixed wireless access terminal.

Referring now to FIG. 2, which is a more detailed block diagram of the fixed wireless access terminal 10, the terminal contains a transmitter 82 and a receiver 84 each connected to the antenna 12 through an RF duplexer 86. The receiver contains a variable gain stage 88 which produces an amplified signal 89 and passes this to a DSP (digital signal processor) 90. The variable gain stage 88 has a gain set by an AGC (automatic gain control) value 91 received from the DSP 90. The DSP 90 computes the AGC value 91 as a function of the amplified signal 89. The terminal has a microcontroller 92 what can receive input from a terminal keypad 94 and which controls what appears on the display 18. The DSP 90 is also connected to send signals to a speaker 98 through a VF codec 100, and to receive signals from a microphone 102 again through the VF codec 100, and to pass a digitized version of this to the transmitter 82.

Incoming signals received by the antenna 18 are demodulated in the receiver 84 and the DSP 90 to create a received bit stream.

The DSP 90 computes a measured RSSI value 104 as a function of the AGC value 91 and passes this to the microcontroller 92. The DSP 90 also calculates the number of bits in the received bit stream which are in error. Firmware running on the DSP 90 executes a Viterbi algorithm on frames of received data. The output of the Viterbi algorithm is a codeword. The codeword is passed back through a convolutional coder. The coded output is then compared with the received data. The Hamming distance between the coded output and the received data gives the number of bit errors for the data frame. This bit error count NBE 106 is passed to the microcontroller 92. The above described method of identifying bit errors is well known in the art and will not be described further here. Other methods of counting bit errors may also be used within the scope of the invention.

The microcontroller 92 performs an averaging function on the RSSI values 104 received from the DSP 90, preferably over one second intervals. This one second average becomes the forward link RSSI measurement RSSI_FWD which is then used as described in further detail below.

The microcontroller 92 also performs an averaging function on the bit error counts NBE 106, again preferably over one second intervals. This one second average becomes the forward link BER measurement BER_FWD which is then used as described in further detail below.

Figure 3:
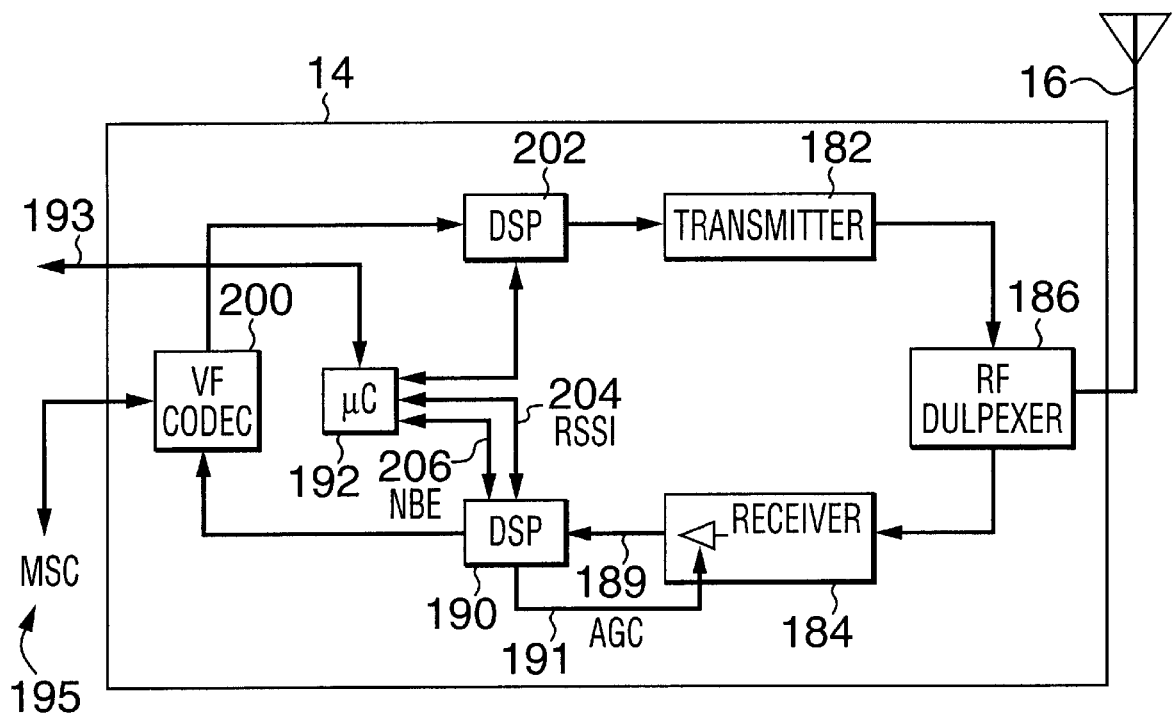
FIG. 3 is a block diagram of a basestation.

Referring now to FIG. 3, which is a more detailed block diagram of the basestation 14, the basestation terminal contains a transmitter 182 and a receiver 184 each connected to the antenna 16 through an RF duplexer 186. The receiver 184 contains a variable gain stage 188 which produces an amplified signal 189 and passes this to a first DSP (digital signal processor) 190. The variable gain stage 188 has a gain set by an AGC (automatic gain control) value 191 received from the DSP 190. The DSP 190 computes the AGC value 191 as a function of the amplified signal 189. The basestation has a microcontroller 192 which is connected to receive control inputs 193 from a MSC (mobile switching centre) generally indicated by 195. The DSP 190 is also connected to send signals to the MSC 195 through a VF codec 200. The MSC may also be connected to the PSTN (Public Switched Telephone Network). A second DSP 202 is connected to receive signals from the MSC 195 again through the VF codec 200, and to pass a digitized version of these to the transmitter 182.

Incoming signals received by the antenna 16 are demodulated in the receiver 184 and DSP 190 to create a received bit stream.

The first DSP 190 computes a measured RSSI value 204 as a function of the AGC value 191 and passes this to the microcontroller 192. The VF codec 200 calculates the number of bits in the received bit stream which are in error in the same manner described above for the fixed wireless access terminal 10. The VF codec 200 is functioning as a DSP to complete this task. A bit error count NBE 206 thus computed is passed to the microcontroller 192 through DSP 190.

The microcontroller 192 performs an averaging function on the RSSI values 204 received from the DSP 190, preferably over one second intervals. The averaged RSSI value is passed back to the MSC 195 for handoff determination. Short term and long term averaging durations may be used. The one second average becomes the reverse link RSSI measurement RSSI_REV which is then used as described in further detail below.

The microcontroller 192 also performs an averaging function on the bit error counts NBE 206, again preferably over one second intervals. This one second average becomes the reverse link BER measurement BER_REV which is then used as described in further detail below.

Figure 4:
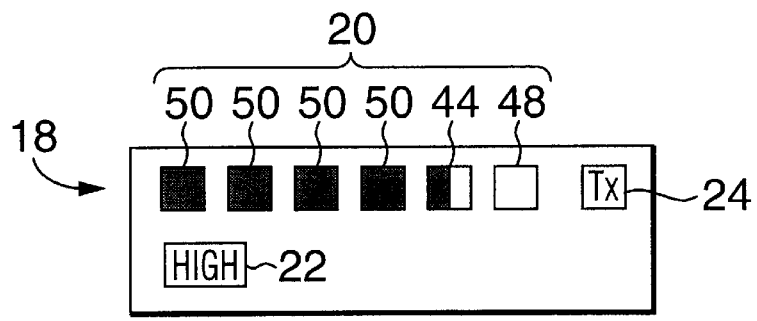
FIG. 4 is a plan view of a display forming part of the terminal of FIG. 1.

Referring now to FIG. 4, in an embodiment of the invention the display 18 (of FIGS. 1 and 2) includes three display fields for conveying link quality information to a user. These include a bar graph field 20 which preferably consists of 6 characters of display space each being five pixels wide, a course link quality indicator field 22 which preferably consists of four characters of display space, and a limiting link identifier field 24 which preferably consists of two characters of display space.

Figure 5:
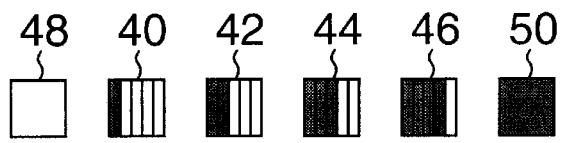
FIG. 5 is an illustration of four new character definitions for use on the display of FIG. 4.

Each display character is typically comprised of a 5'7 pixel matrix, i.e. five columns and seven rows. There is a conventional extended set of ASCII character definitions which displays are typically capable of displaying. According to an embodiment of the invention, six display characters definitions including four new custom display characters or pixel matrices are defined for use in displaying RSSI values in the bar graph field 20 of the display 18. These four new display character definitions are illustrated in FIG. 5. A first new display character definition 40 is defined which has the first of its five columns of pixels turned on. The next three new display character definitions 42,44,46 are defined which have the first two, first three and first four of their five columns of pixels turned on, respectively. In addition to the new display character definitions, the completely empty pixel matrix 48, and the completely shaded pixel matrix 50 are used, these being standard display character definitions which require no customization. This set of display character definitions allow a higher resolution bar graph to be displayed.

Figure 6:
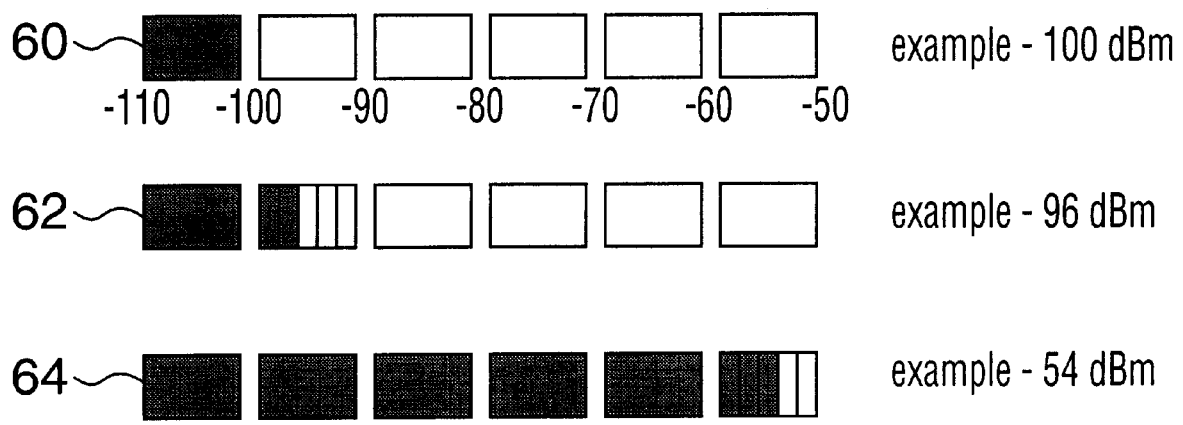
FIG. 6 is an illustration of three example bar graphs.

Referring to FIG. 6, the appearance of the bar graph field 18 for three different RSSI values is shown. In these examples, a completely shaded pixel matrix 50 represents 10 dBm of RSSI range, with each column of pixels representing 2 dBm of RSSI range. In these examples, the bar graph has a full field display range of −110 dBm to −50 dBm. In the first example 60 of FIG. 6, an RSSI of −100 dBm is being displayed. In the second example 62 of FIG. 6, an RSSI of −96 dBm is being displayed. In the third example 64 of FIG. 6, an RSSI of −54 dBm is being displayed. Clearly, only one of the six display character spaces would ever be partially illuminated with the remaining spaces being either fully illuminated or no illuminated at all.

The terminal 10 measures RSSI_FWD and the BER_FWD for the signals on the forward link incoming from the basestation 14 as described above and displays one or more signal quality metrics on the display 16. In addition, the basestation 14 measures the RSSI_REV and BER_REV for signals on the reverse link incoming from the terminal 10 as described above and forwards these to the terminal in a message, herein referred to as a channel quality message.

Figure 7:
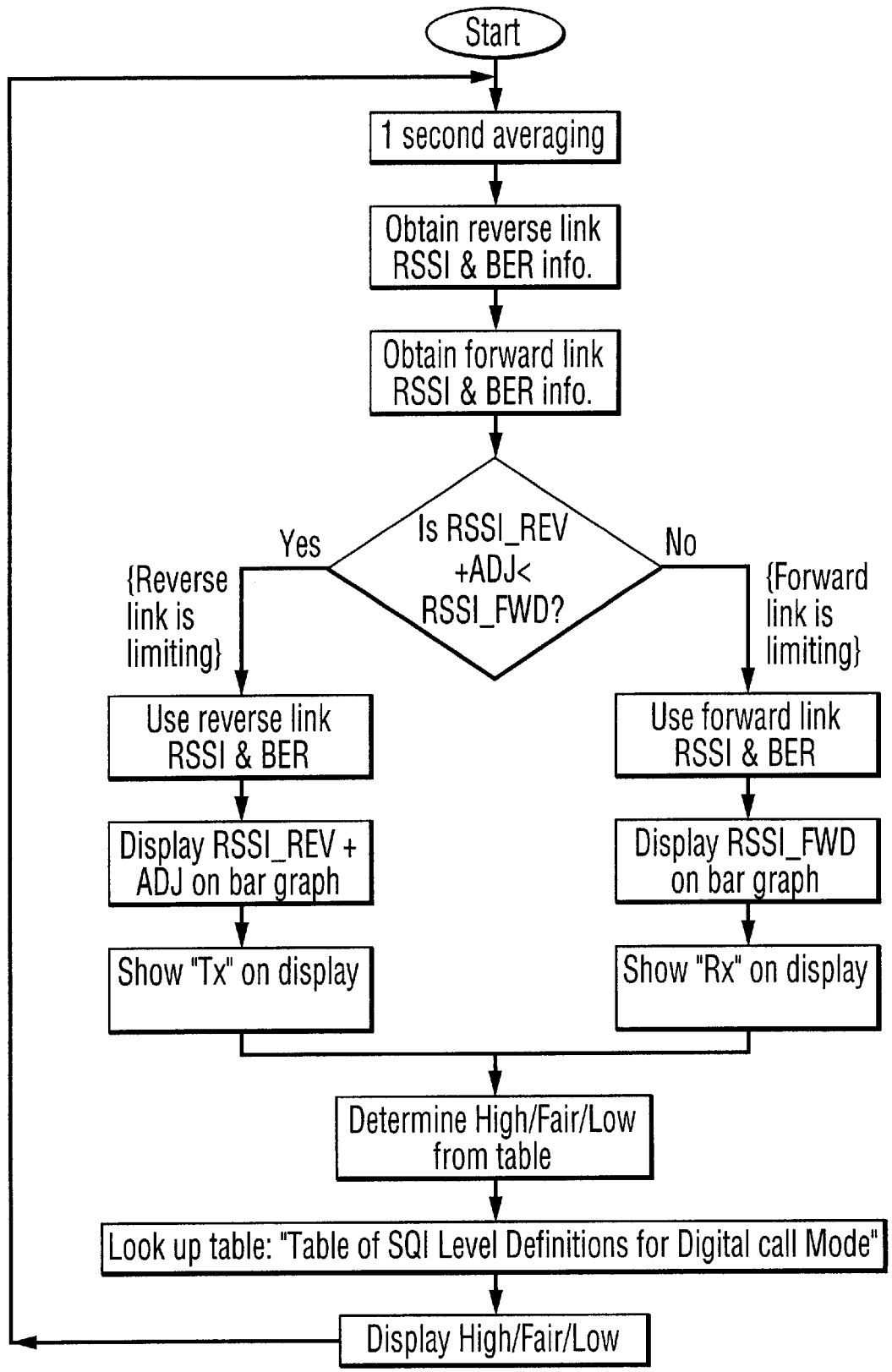
FIG. 7 is a flowchart for an embodiment of the invention enabling the display of a signal quality indicator using reverse link and forward link information.

Referring now to FIG. 7, the sequence of steps executed by a subscriber terminal for updating and displaying the signal quality metrics using reverse link and forward link information will be described. The first step is to obtain the reverse link RSSI and BER information RSSI_REV, BER_REV and to then obtain the forward link RSSI and BER information RSSI_FWD, BER_FWD. These are determined as described previously. Next a determination of which of the two links is the limiting link is made on the basis of the RSSI measurements alone. This is done by comparing RSSI_REV+ADJ with RSSI_FWD. ADJ is an adjustment factor selected to compensate for a differing link quality in the reverse link versus the forward link. In general this is due to different basestation versus subscriber terminal sensitivities.

In the case that the reverse link is limiting, the reverse link values RSSI_REV and BER_REV are used. The value RSSI_REV+ADJ is displayed on the bar graph 20 on the terminal display 18. The symbol "Tx" is also displayed in the display limiting link identifier field 24 to indicate that it is the reverse link which is limiting.

In the case that the forward link is limiting, the forward link values RSSI_FWD and BER_FWD are used. The value RSSI_FWD is displayed on the bar graph 20 on the terminal display 18. The symbol "Rx" is also displayed in the display limiting link identifier field 24 to indicate that it is the forward link which is limiting.

The process then continues the same for both the forward link limited and the reverse link limited cases. A determination of whether a HIGH/FAIR/LOW course link quality is present is determined on the basis of the limiting link's BER and RSSI measurements. This may be achieved through the use of a lookup table exemplified in Table 1 as follows:

TABLE 1

Course Link Quality Definitions

| Course Link Quality | RSSI | BER |
| --- | --- | --- |
| HIGH | RSSI > −85 dBm | BER < 1% |
| FAIR | −85dBM > RSSI ≥ −100 dBm | 1% < BER < 5% |
| LOW | RSSI < −100 dBm | BER ≥ 5% |

Then the appropriate course link quality is displayed on the display 16 in the course link quality indicator field 22.

The course link quality definitions in Table 1 were selected such that each of the three course link qualities represents a defined set of characteristics. For example the three above identified course link qualities may represent the link performance/user perspective summarized in Table 2

TABLE 2

Characteristics of Course Link Qualities

| Course Link Quality | Link Performance/User Perspective |
| --- | --- |
| HIGH | Reliable connection, best voice quality, low background noise |
| FAIR | Reliable connection, uneven voice quality, uneven background noise and swirl |
| LOW | Unreliable connection, consistently low voice quality, significant background noise and swirl |

Figure 8:
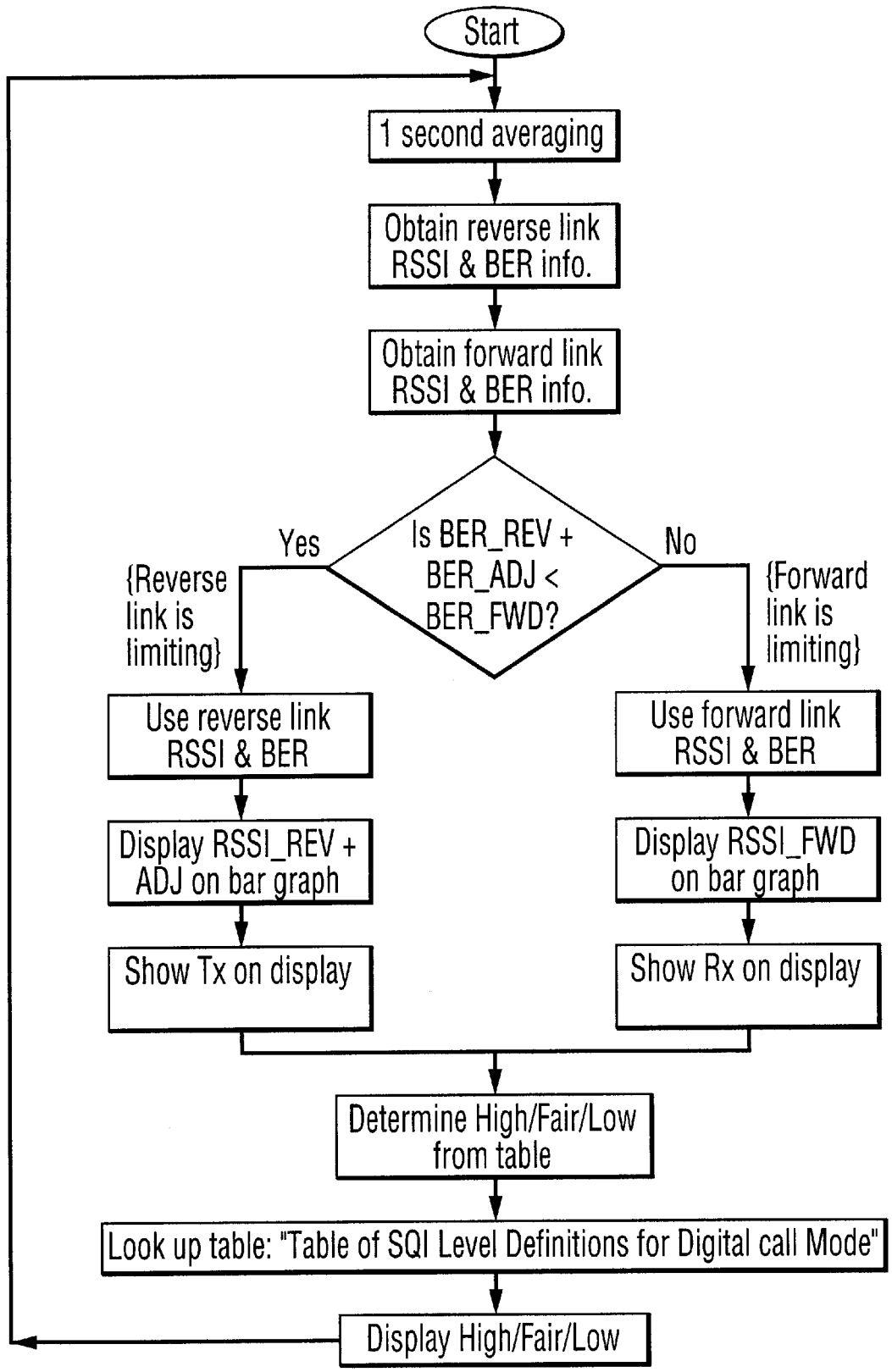
FIG. 8 is a flowchart for another embodiment of the invention enabling the display of a signal quality indicator using reverse link and forward link information.

Referring now to FIG. 8, another method of displaying signal quality information on the subscriber terminal will be described. This method is very similar to that described with reference to FIG. 7. The only difference is that in determining which link is the limiting link, a comparison between the BERs is made. BER_REV*BER_ADJ is compared with BER_FWD, and if BER_FWD is larger, then the forward link is limiting, and otherwise the reverse link is limiting. BER_ADJ is an adjustment factor to compensate for differing link quality in the reverse link versus the forward link.

In the first above described example, the RSSI alone is used in determining which link is the limiting link. In the second above-described example, the BER alone is used in determining which link is the limiting link. Alternatively, this determination may be made on the basis of some combination of the BER and RSSI measurements for the two links.

In another embodiment of the invention, the reverse link RSSI and BER measurements are used to perform transmit diversity at the subscriber terminal. For this embodiment, the fixed access wireless terminal requires two transmit antennae and the method provides a technique for determining which of the two antennae to transmit on. A block diagram of the terminal for this embodiment is shown in FIG. 9. This differs from the terminal of FIG. 2 in that there are two antennas 12, 210 which are connected to a switch 212 which is then connected to the RF duplexer 86. The switch 212 is connected to receive a toggle command 214 from the microcontroller 92 which, when received, causes the switch to disconnect the presently connected one of antennas 12, 210, and to connect the other of the antennas.

A flowchart for a first transmit diversity implementation for use with the terminal of FIG. 9 is shown in FIG. 10. The first step in the method is for the basestation to update the RSSI_REV and BER_REV values. Again, it assumed that this is done over a one second averaging interval. Next, two threshold comparisons are made, one for each of BER and RSSI. If RSSI_REV<RSSI_Threshold, or if BER_REV>BER_Threshold then a decision is made that a switch in the transmit antenna at the subscriber terminal should be made, where RSSI_Threshold is the RSSI comparison threshold, and BER_Threshold is the BER comparison threshold.

The thresholds RSSI_Threshold, BER_Threshold used for the BER and RSSI may be determined to satisfy various requirements. Existing algorithms in IS-54 compliant basestations and terminal implement a reverse link closed loop power control methodology. The terminal transmit power is adjusted up 4 dB whenever the receive RSSI from a given terminal detected by the basestation drops below a threshold entitled DPC_THR (dynamic power control threshold) typically due to a fade.

Preferably, the RSSI_Threshold is set to be slightly above DPC_THR such that the toggling of the terminal's transmit antenna may mitigate the fade and avoid the need to increase the terminal level. Advantageously, this will reduce network reverse link interference and improve performance. In the example illustrated in FIG. 10 RSSI_Threshold has been set to equal DPC_THR+xDB where xDB is a margin selected to result in antenna toggling before the DPC_THR threshold is encountered.

A DPC system may also be based upon BER, in which case if a BER measured by a basestation on a signal from a terminal is below a threshold BER_DPC_THR then the terminal transmit power is adjusted up 4 dB. BER_Threshold may be set such that a switch in antennas occurs just before a DPC adjustment would have been required. In the illustrated example of FIG. 10, BER_Threshold has been set to equal BER_DPC_THR/y where y is a factor selected to cause an antenna switch to occur before a DPC adjustment would have been required.

In the embodiment of FIG. 10, this threshold comparison is performed at the basestation in which case if a determination is made that a switch in the transmit antenna should be made, a toggle command is generated and transmitted to the subscriber terminal in a message. Upon receipt of the toggle message, the micro controller 92 would send the command to the switch 212 resulting in a switch between transmit antennas.

Another embodiment of the transmit diversity aspect of the invention is depicted in the flowchart shown in FIG. 11. In this case, the BER_REV and RSSI_REV measurements are transmitted in a message to the subscriber terminal, and the threshold comparisons are performed by the subscriber terminal, and a switch in the transmit antenna is made on the basis of these comparisons.

In illustrated embodiments, the course link quality indicator was used to display one of three discrete values. More generally, preferably it may be used to display two or more values, and more preferably either two, three, four or five values.

Numerous modifications and variations of the present invention are possible in light of the above teachings. It is therefore to be understood that within the scope of the appended claims, the invention may be practised otherwise than as specifically described herein.

We claim:

1. A method for a fixed wireless access terminal to indicate the quality of a mobile communications link between the fixed wireless access terminal and a basestation, the mobile communications link including a forward link from the basestation to the terminal, and a reverse link from the terminal to the basestation, the method comprising the steps of:
    a) the terminal measuring an RSSI in the forward link and a BER in the forward link;
    b) the basestation determining an RSSI in the reverse link and a BER in the reverse link and conveying this to the terminal in a message;
    c) the terminal determining a link quality metric on the basis of both the forward link BER and RSSI and the reverse link BER and RSSI; and
    d) the terminal displaying the link quality metric.

2. A method according to claim 1 wherein step d) comprises displaying the link quality metric in bar graph form with a resolution of 2 dB per pixel or greater.

3. A method according to claim 1 further comprising the step of c1) determining whether the reverse link is limiting or the forward link is limiting and wherein in step d), the RSSI for the limiting link is displayed in bar graph form.

4. A method according to claim 3 wherein step c1) is performed by comparing the forward link RSSI with the reverse link RSSI to determine which link has the worse RSSI, and selecting that as the limiting link.

5. A method according to claim 4 further comprising the step of the terminal displaying a limiting link identifier which identifies which of the forward link and the reverse link is the limiting link.

6. A method according to claim 5 wherein the link quality information is a reverse link RSSI measurement and a reverse link BER measurement and further comprising the steps of:
    the basestation comparing the reverse RSSI measurement and BER measurement to respective predetermined levels;
    if either the reverse RSSI measurement is below its predetermined level, or if the BER measurement is above its predetermined level, the basestation sending a toggle message to the terminal;
    the terminal performing said switch from one antenna to the other antenna on the basis of the toggle message.

7. A method according to claim 3 wherein in step c1) is performed by comparing the forward link BER with the reverse link BER to determine which link has the worse BER, and selecting that as the limiting link.

8. A method according to claim 1 further comprising the step of displaying a course link quality indicator, the course link quality indicator having at least two discrete values each representing a defined range of RSSI and BER values.

9. A method according to claim 8 wherein the course link quality indicator has either two, three, four or five discrete values.

10. A method according to claim 9 further comprising the step of periodically receiving in a message from the basestation containing a redefinition of the range of RSSI and BER values for each of said discrete values.

11. A method according to claim 1 wherein the link quality metric is only displayed when it is below a predetermined threshold.

12. A method according to claim 10 wherein the display of the link quality metric turns off after a delay period if the link quality metric exceeds the predetermined threshold.

13. A method according to claim 1 further comprising the steps of:
    a) the basestation determining a link quality for the reverse link;
    b) the basestation sending a message to the terminal on the basis of the link quality information;
    c) the terminal receiving the message from the basestation, and on the basis of its contents either performing a switch from one transmit antenna to another transmit antenna, or not.

14. A method according to claim 13 wherein the link quality information is a reverse link RSSI measurement and a reverse link BER measurement and wherein said message contains these measurements, the method further comprising the steps of:
    the terminal comparing the reverse RSSI measurement and BER measurement to respective predetermined levels;
    if either the reverse RSSI measurement is below its predetermined level, or if the BER measurement is above its predetermined level, performing said switch from one antenna to the other antenna, and otherwise not performing the switch.

15. A fixed wireless access terminal for wireless connection to a basestation over a mobile communications link including a forward link from the basestation to the terminal, and a reverse link from the terminal to the basestation, the terminal comprising:
    a display;
    circuitry for receiving a message from said basestation containing a reverse link RSST and a reverse link BER;
    circuitry for measuring a forward link DER and RSSI, determining a link quality metric on the basis of the forward link DER and RSSI and the reverse link DER and RSSI, and displaying the link quality metric on the display.

16. A terminal according to claim 15 wherein said display comprises a high resolution bar graph field for displaying an RSSI measurement.

17. A terminal according to claim 16 wherein the bar graph has a resolution of 2 dB or better.

18. A terminal according to claim 16 wherein said circuitry determines whether the reverse link is limiting or the forward link is limiting and wherein the RSSI for the limiting link is displayed in the graph.

19. A terminal according to claim 16 wherein the limiting link is identified by comparing the forward link RSSI with the reverse link RSSI to determine which link has the worse RSSI, and selecting that as the limiting link.

20. A terminal according to claim 16 wherein the limiting link is identified by comparing the forward link BER with the reverse link BER to determine which link has the worse BER, and selecting that as the limiting link.

21. A terminal according to claim 16 wherein said display further comprises a course link quality indicator field, wherein said circuitry updates the course link quality indicator to display one of at least two discrete values each representing a defined range of RSSI and BER values.

22. A terminal according to claim 16 wherein the display further comprises a limiting link identifier field, and the circuitry updates the limiting link identifier field to identify which link is the limiting link.

23. A fixed wireless access terminal for wireless connection to a basestation over a mobile communications link including a forward link from the basestation to the terminal, and a reverse link from the terminal to the basestation, the terminal comprising:

a first transmit antenna and a second transmit antenna;

a switch for alternatively connecting the first antenna and said second antenna to said wireless connection;

circuitry for receiving a message from the basestation respecting the quality of the reverse link, and for, on the basis of contents of the message, instructing said switch to switch from one transmit antenna to another transmit antenna, or not;

wherein the message contains link quality information consisting of a reverse link RSSI measurement and a reverse link BER measurement, wherein said circuitry compares the reverse RSSI measurement and BER measurement to respective predetermined levels, and if either the reverse RSSI measurement is below its predetermined level, or if the BER measurement is above its predetermined level, instructs said switch to switch from one antenna to the other antenna.

* * * * *